(12) United States Patent
Fliearman et al.

(10) Patent No.: US 10,107,363 B2
(45) Date of Patent: Oct. 23, 2018

(54) COMPACT MULTI-SPEED PLANETARY DRIVE ASSEMBLY

(71) Applicant: Deere & Company, Moline, IL (US)

(72) Inventors: Steven R. Fliearman, Coffeyville, KS (US); Randall L. Long, Coffeyville, KS (US)

(73) Assignee: DEERE & COMPANY, Moline, IL (US)

(*) Notice: Subject to any disclaimer, the term of this patent is extended or adjusted under 35 U.S.C. 154(b) by 52 days.

(21) Appl. No.: 15/009,130

(22) Filed: Jan. 28, 2016

(65) Prior Publication Data

US 2017/0219052 A1  Aug. 3, 2017

(51) Int. Cl.
*F16H 3/54* (2006.01)
*B60K 17/04* (2006.01)
*F16D 25/06* (2006.01)
*F16H 61/30* (2006.01)
*F16D 13/76* (2006.01)
*F16D 25/0638* (2006.01)
*F16D 25/10* (2006.01)

(52) U.S. Cl.
CPC ............ *F16H 3/54* (2013.01); *B60K 17/046* (2013.01); *F16D 13/76* (2013.01); *F16D 25/06* (2013.01); *F16D 25/0638* (2013.01); *F16D 25/10* (2013.01); *F16H 61/30* (2013.01); *F16H 2200/0034* (2013.01); *F16H 2200/2005* (2013.01); *F16H 2200/2035* (2013.01)

(58) Field of Classification Search
CPC .............. F16H 3/54; F16H 2200/0034; F16H 2200/2005; F16H 2200/2035; F16D 25/06; B60K 17/046; B60K 17/06
See application file for complete search history.

(56) References Cited

U.S. PATENT DOCUMENTS

| | | | | |
|---|---|---|---|---|
| 3,115,204 A | * | 12/1963 | Dence | B60K 17/046 180/10 |
| 4,037,694 A | * | 7/1977 | Keese | B60T 1/062 180/370 |
| 4,142,615 A | * | 3/1979 | Sidles, Jr. | B60K 17/046 180/370 |
| 4,238,967 A | * | 12/1980 | Volkov | B60K 17/046 475/280 |
| 5,024,636 A | * | 6/1991 | Phebus | B60K 17/046 475/141 |

(Continued)

OTHER PUBLICATIONS

German Patent and Trade Mark Office, Search Report in German Patent Application No. 10 2017 201 189.0 dated Nov. 9, 2017.

*Primary Examiner* — Justin Holmes
*Assistant Examiner* — David R Morris
(74) *Attorney, Agent, or Firm* — Klintworth & Rozenblat IP LLP; Steven J. Wietrzny (57) ABSTRACT

A drive assembly receives rotational power from an input shaft rotatable about a rotation axis. The drive assembly includes a drive housing to which is mounted a wheel bearing support of a wheel mount that is configured to rotate about the rotation axis on a wheel bearing assembly. A planetary set is coupled between the input shaft and the wheel mount to selectably cause rotation of the wheel mount. The planetary set substantially fits within axial borders of the wheel bearing support and within an inner radial dimension of the wheel bearing support.

20 Claims, 8 Drawing Sheets

(56) References Cited

U.S. PATENT DOCUMENTS

| | | | | |
|---|---|---|---|---|
| 5,087,229 A | * | 2/1992 | Hewko | B60K 7/0007 180/65.51 |
| 6,135,259 A | * | 10/2000 | Forster | B60K 7/0015 180/307 |
| 6,890,282 B2 | * | 5/2005 | Oberstarr | B60K 17/046 180/255 |
| 7,556,580 B2 | * | 7/2009 | Saito | B60K 7/0007 180/65.51 |
| 8,403,806 B2 | * | 3/2013 | Haupt | F16H 3/54 475/311 |
| 8,758,181 B2 | | 6/2014 | Calvert | |
| 8,961,361 B2 | * | 2/2015 | Ishizuka | F16H 57/08 180/184 |
| 9,046,154 B2 | * | 6/2015 | Ishizuka | B60K 17/046 |
| 9,429,227 B2 | * | 8/2016 | Noerenberg | F16H 57/10 |
| 9,625,021 B2 | * | 4/2017 | Knoblauch | F16H 37/0833 |
| 2009/0247346 A1 | | 10/2009 | Hvolka et al. | |
| 2010/0160107 A1 | | 6/2010 | Rice et al. | |
| 2010/0294576 A1 | * | 11/2010 | Wargh | B60K 7/0007 180/55 |
| 2011/0124462 A1 | | 5/2011 | Meyer et al. | |
| 2016/0263987 A1 | * | 9/2016 | Brownell | B60K 17/046 |

* cited by examiner

COMPACT MULTI-SPEED PLANETARY DRIVE ASSEMBLY

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to drive arrangements, and in particular to drives for work vehicles.

BACKGROUND OF THE DISCLOSURE

In various work vehicle applications, a drive assembly may be utilized to provide rotational power to various components of the vehicle. In some wheeled or tracked vehicles, such as motor graders, a final drive assembly is mounted to a frame of the vehicle to provide rotational power, at a wheel mount of the drive assembly, to drive the wheels or tracks of the vehicle, and thereby move the vehicle over terrain. Such a drive assembly (and others) may include hydraulic motors for providing rotational power, and various gears for adjusting the speed of the rotational power for output at the wheel mount.

In some cases, the motors may be operated at one or more different speeds. While the use of multiple speeds in a drive assembly can significantly reduce the cost of the related motors, inverters, and electrical devices, the higher operating speeds of an electric motor significantly increases the ratios required from the drive assembly and can simultaneously result in an increase in size and cost of the overall drive assembly. Arranging and packaging complex assemblies such as these, along with gear trains, shifting assemblies, bearings, shafts and other drive components, in what may be a relatively tight space envelop, particularly in the axial direction, can be a challenge.

SUMMARY OF THE DISCLOSURE

The disclosure provides a drive with a multi-speed shifting assembly having a compact form factor.

One aspect the disclosure provides a drive assembly receives rotational power from an input shaft rotatable about a rotation axis. The drive assembly includes a drive housing to which is mounted a wheel bearing support of a wheel mount that is configured to rotate about the rotation axis on a wheel bearing assembly. A planetary set is coupled between the input shaft and the wheel mount to selectably cause rotation of the wheel mount. The planetary set substantially fits within axial borders of the wheel bearing support and within an inner radial dimension of the wheel bearing support.

Another aspect the disclosure provides a drive assembly including drive housing, a motor mounted to the drive housing and rotating an input shaft about a rotation axis, and a wheel mount having a wheel bearing support mounted to the drive housing and configured to rotate about the rotation axis on a wheel bearing assembly. A planetary set is coupled between the input shaft and the wheel mount to selectably cause rotation of the wheel mount at one of at least two different rotational speeds. The planetary set substantially fits within axial borders of the wheel bearing support and within an inner radial dimension of the wheel bearing support.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed multi-speed drive arrangement, as shown in the accompanying figures of the drawings described briefly above. Various modifications to the example embodiments may be contemplated by one of skill in the art.

As mentioned above, known designs for multi-speed drive assemblies may be unsatisfactory in a number of respects. For example, such drives may exhibit significant complexity, leading to high manufacturing costs and a significant increase in size and weight. This is particularly the case in off-highway and other such work vehicles, such as motor graders, self-propelled sprayers and the like, in which it is desirable for the drive to provide multiple speeds, while at the same time reducing the space envelope required for the drive. In the case of certain in-line drive arrangements, such as final drives, a key envelope dimension is the axial dimension about which certain drive components rotate to drive the wheels or other vehicle components.

In this regard, the term "axial" as used herein refers to a direction that is generally parallel to an axis of rotation, axis of symmetry, or centerline of a component or components. For example, in a cylinder with a centerline and opposite, circular ends, the "axial" direction may refer to the direction that generally extends in parallel to the centerline between the opposite ends. In certain instances, the term "axial" may be utilized with respect to components that are not cylindrical (or otherwise radially symmetric). For example, the "axial" direction for a rectangular housing containing a rotating shaft may be viewed as a direction that is generally in parallel with the rotational axis of the shaft. Furthermore, the term "radially" as used herein may refer to a direction or a relationship of components with respect to a line extending perpendicularly outward from a shared center line, axis, or similar reference. For example, two concentric and axially overlapping cylindrical components may be viewed as "radially" aligned over the portions of the components that axially overlap, but not "radially" aligned over the portions of the components that do not axially overlap. In certain instances, components may be viewed as "radially" aligned even though one or both of the components may not be cylindrical (or otherwise radially symmetric).

Certain known drive assemblies may include a motor mounted at an end of a gear housing of the drive assembly. The gear housing may be integrally formed with a hub, which may be attached to an external device, such as a wheel or sprocket, in order to provide rotational power from the motor to the external device. One or more planetary (or "epicyclical") gear sets in communication with the motor may be disposed within the gear housing in order to provide a speed reduction of various ratios with respect to the rotational power from the motor. The drive may incorporate various complex assemblies, such as compound planetary sets, to provide multiple speeds and the desired high gear reduction and torque. The axial dimension of such drives gear sets can be larger than desired for certain applications.

The embodiments of the disclosed drive may address various of the issues noted above, as well as provide various additional benefits. Generally, in place of the relatively large shifting assemblies of prior art drives, the shifting assembly, or at least the planetary gear set or clutch components thereof, are positioned such that it substantially fits within (or "under") the wheel bearing support of the drive assembly—i.e., the shifting assembly substantially fits within the axial borders of the wheel bearing support and within inner radial dimension of the wheel bearing support. In this way, the shifting assembly (including, for example, one or more clutch and planetary components) may be more compactly disposed, resulting in a reduced axial dimension.

In certain embodiments the axially compact nature of the shifting assembly may, in part, be facilitated by a relatively large diameter spring and piston arrangement that provides the spring-applied, hydraulically-released clutch energization for effecting different modes of operation of the drive. For example, the shifting assembly may include one or more spring and piston arrangements that engage and disengage a corresponding number of clutch components. The springs may be sized so that may be positioned in a radially different location (e.g., radially outward of) the clutch. This not only reduces the axial space occupied by the shifting assembly, but the use of larger springs also provides for greater axial force to be applied to the clutch components over a shorter axial distance. The more robust springs further work to improve the life of the shifting assembly since less deflection for each actuation of the clutch component is required.

In still other embodiments the shifting assembly may be in the form of a simple single planetary set, thereby reducing cost and complexity of the assembly. For example, the single planetary set may be a 2-speed sun gear input, carrier output configuration. The single planetary arrangement may also be configured to provide neutral and park modes. The neutral mode prevents the wheels from back-driving and overrunning the motor, and the park mode locks the vehicle wheels against rotation.

Referring now to the drawings, the disclosed drive assembly may be utilized in the context of a wide range of work vehicles, including, as mentioned, a motor grader. In this regard, while a motor grader is illustrated and described herein as an example work vehicle, one skilled in the art will recognize that principles of the multi-speed drive arrangement disclosed herein may be readily adapted for use in other types of work vehicles, including, for example, various crawler dozer, loader, backhoe and skid steer machines used in the construction industry, as well as various other machines used in the agriculture and forestry industries, such as tractors, sprayers, skidders and the like. As such, the present disclosure should not be limited to applications associated with motor graders or the particular example motor grader shown and described.

Figure 1:
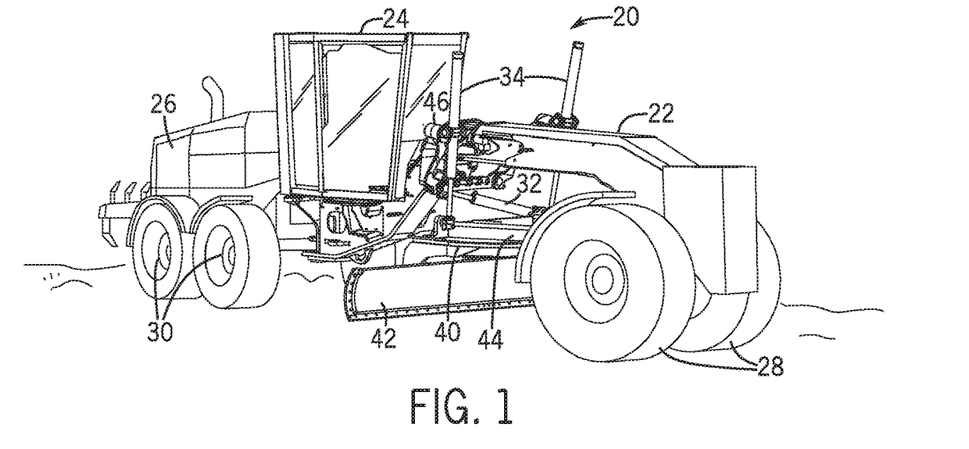
FIG. 1 is perspective view of a work vehicle in the form of a motor grader in which the drive assembly of this disclosure may be incorporated.

As shown in FIG. 1, a motor grader 20 may include a main frame 22 supporting an operator cabin 24 and a power plant 26 (e.g., a diesel engine) operably coupled to power a drive train. The main frame 22 is supported off of the ground by ground-engaging steered wheels 28 at the front of the machine and by two pairs of tandem drive wheels 30 at the rear of the machine. The power plant may power one or more hydraulic pumps (not shown), which pressurize hydraulic fluid in a hydraulic circuit including various electro-hydraulic valves, hydraulic drives and hydraulic actuators, including a circle shift actuator 32, lift actuators 34, a blade shift actuator (not shown) and a circle rotate drive (not shown). In the illustrated example, the main frame 22 has an articulation joint (not shown) between the operator cabin 24 and power plant 26 that allows the front section of the main frame 22 to deviate from the centerline of the rear section of the main frame 22, such as during a turning operation to shorten the effective wheelbase of the motor grader 20, and thus, shorten the turning radius of the machine. A circle 40 and blade 42 assembly is mounted to the main frame 22 in front of the operator cabin 24 by a drawbar 44 and a lifter bracket 46, which in certain embodiments may be pivotal with respect to the main frame 22. Cylinders of the lift actuators 34 may be mounted to the lifter bracket 46, and pistons of the lift actuators 34 may be connected to the circle 40 so that relative movement of the pistons may raise, lower and tilt the circle 40, and thereby the blade 42. The circle 40, via the circle drive and various actuators, causes the blade 42 to be rotated relative to a vertical axis as well as shifted sideways or laterally in relation to the main frame 22 and/or the circle 40. The drive wheels 30 of the motor grader 20 are driven by a drive assembly (not shown in FIG. 1) configured as a final drive assembly that is mounted to frame 22 of motor grader 20 in order to provide motive power to the drive wheels 30. It will be understood that the disclosed drive assembly may be utilized as a final drive assembly, as illustrated for providing motive power to a ground-engaging element of the vehicle (e.g., wheels, tracks, or the like), or may be utilized to provide rotational power to other types of devices.

Figure 2:
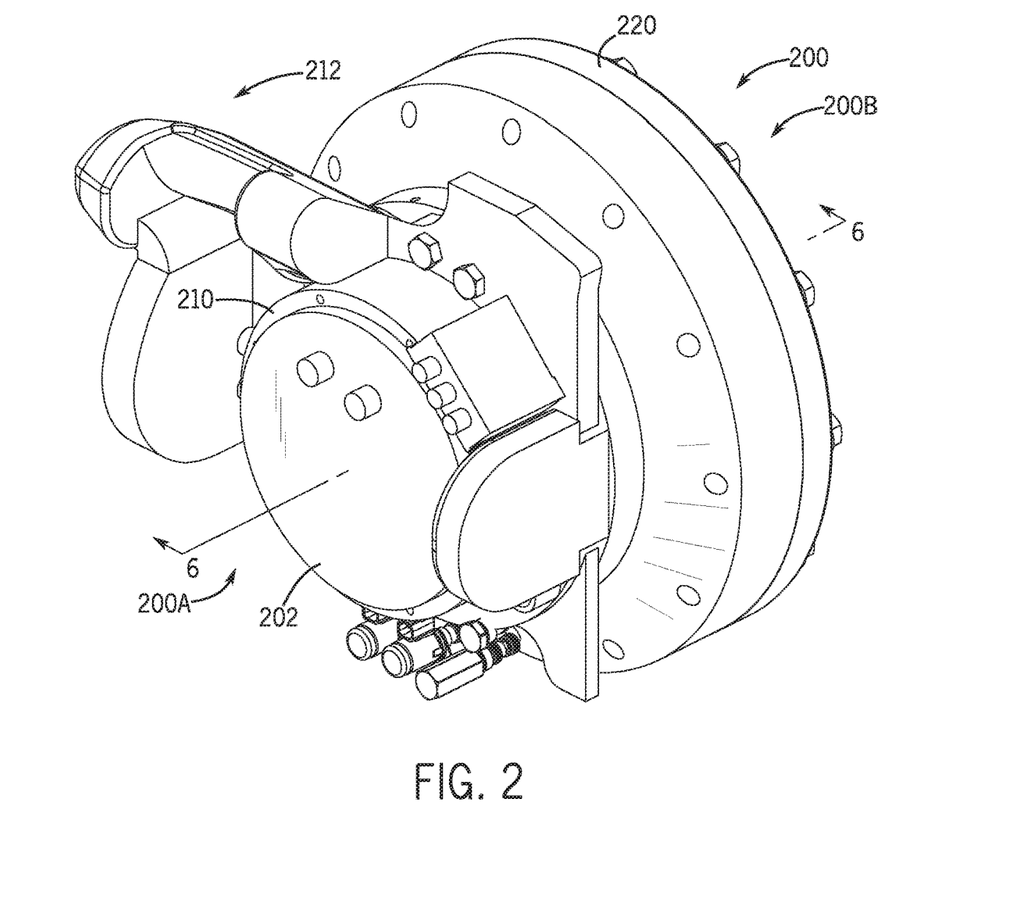
FIG. 2 is a perspective, exterior overview of an example drive assembly according to the present disclosure.

FIG. 2 illustrates the exterior of an example drive assembly 200 that may be used to turn the drive wheels 30 shown in FIG. 1. As depicted, the drive assembly 200 generally includes a mounting assembly 212 to facilitate attachment to the frame 22 of the motor grader 20. The mounting assembly 212 may be included as a part of a larger drive housing (or simply "housing") 210 of the drive assembly 200, and is configured to remain relatively stationary during operation of the drive assembly 200, as will described in further detail below. A drive motor 202 may be attached to the drive housing 210 (e.g., via a motor mount, not illustrated) at an axial end 200A of the drive assembly 200, such that the drive motor 202 may be held in an appropriately stationary orientation for delivery of rotational power to the drive assembly 200. The drive motor 202 may be implemented as an electric motor (or other power source, such as a hydraulic motor) including a drive shaft (not shown in FIG. 2) extending towards another axial end 200B of the drive assembly 200. In other embodiments, alternate configurations are possible. The drive assembly 200 may further include a wheel mount 220, which may be configured to directly engage the wheels 30 of the motor grader 20, or may mount an intermediate power transmission component. In any case, rotation of the wheel mount 220 may drive movement of the wheels 30, and thereby movement of the motor grader 20.

Figure 3:
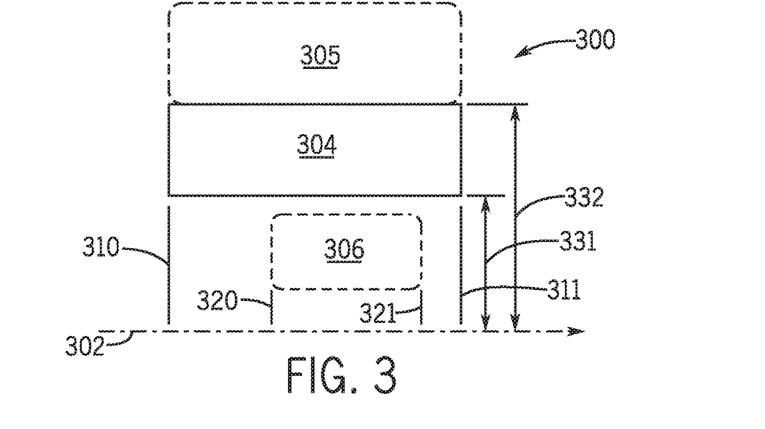
FIGS. 3-5 are conceptual diagrams illustrating the position of a shifting arrangement with respect to bearings and bearing supports in accordance with various embodiments.
Figure 4:
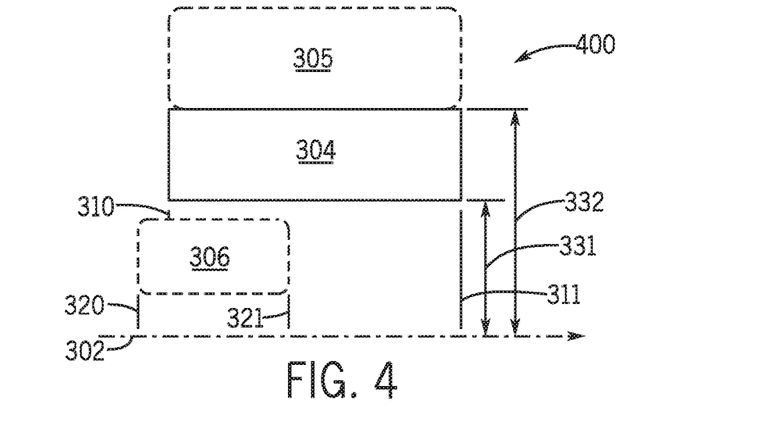
Figure 5:
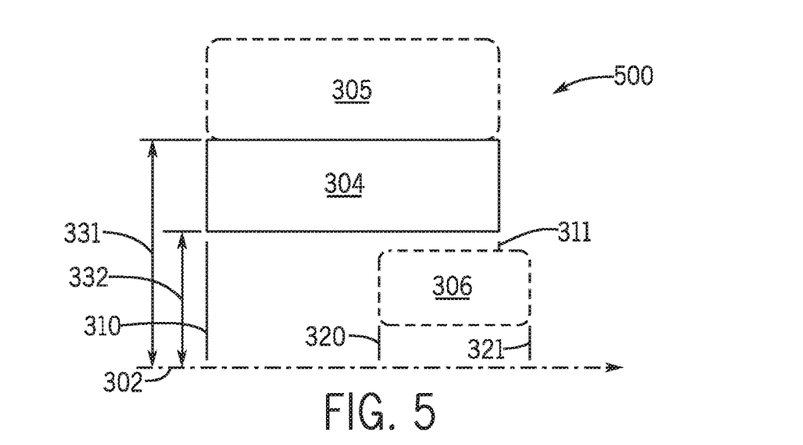

As mentioned briefly above, drive assemblies in accordance with various embodiments are configured such that their shifting assemblies, or at least the planetary sets and clutch components thereof, are located substantially "beneath" or "within" their wheel bearing supports (in some cases the wheel bearings themselves) in order to minimize the overall axial dimension of the drive assembly. In this regard, FIGS. 3-5 illustrate various configurations that assist in understanding the geometrical aspects of this feature from a conceptual, abstract point-of-view. Specifically, FIGS. 3-5 are conceptual cross-sectional views of example drive assemblies in which only one half (radially) of the drive assembly is shown, assuming rotational symmetry about a rotational axis 302. Only three components are illustrated, namely, a wheel bearing assembly 304, a bearing support 305 and a shifting assembly 306. It will be understood that the generally rectangular shape of these various components is not intended to be limiting, and is only chosen for simplicity of illustrating the general relative positions of such components. Thus, wheel bearing assembly 304 may include one, two, or more wheel bearings configured in a variety of arrangements, as described in further detail below. Likewise, bearing support 305 may have any suitable shape and structure configured to provide structural support (e.g., axial, tangential, and/or radial support) to wheel bearing assembly 304. Shifting assembly 306 may include a variety of components, such as clutch packs, actuators, and gears (e.g., a planetary gear arrangement described below) that together allow the drive assemblies (300, 400, 500, respectively) to implement a variety of modes, such as "high", "low", "neutral" and "park" modes (referred to respectively as simply H, L, N and P modes herein). In each of FIGS. 3-5, the arrowhead on axis 302 points to the "outboard" direction (i.e., toward end 200B in FIG. 2), and the opposite axial direction corresponds to the "inboard" direction (i.e., toward end 200A of FIG. 2). The vertical axis in FIGS. 3-5 corresponds to the radial direction, increasing as it extends from rotational axis 302.

FIG. 3 depicts the case in which the shifting assembly 306 fully fits within the axial borders of the wheel bearing support. More particularly, the bearing support has an outboard edge (or border) at an axial position 311, and an inboard edge (or border) at an axial position 310. Similarly, the shifting assembly 306 has an outboard edge at an axial position 321, and an inboard edge at an axial position 320. Thus, in this embodiment both axial positions 320 and 321 lie within, are fully contained within, or otherwise fit between axial positions 310 and 311 of the bearing support 305. FIG. 3 also depicts the case where the shifting assembly 306 fits fully within the axial borders of the wheel bearing 304. Depending upon the general configuration of the wheel bearing 304, this may or may not be the case in any particular embodiment.

Note that in all of the examples shown in FIGS. 3-5 (drive assemblies 300, 400, and 500), the shifting assembly 306 also fits within the inner radial dimensions (331 and 332) of the bearing support 305. In some embodiments, various components of the shifting assembly 306 may have an axial position that is greater than radial distance 331. However, in such a case, the shifting assembly 306 as a whole may be said to fit "substantially within" the inner radial dimension 331 of the bearing support 305.

In contrast to FIG. 3, FIG. 4 depicts the case in which the shifting assembly 306 is partially inboard of the bearing support 305. That is, the inboard edge 320 of the shifting assembly 306 is to the left (in FIG. 4) of, or inboard relative to, the inboard edge of the bearing support 305. Similarly, FIG. 5 depicts the case in which the shifting assembly 306 is partially outboard of the bearing support 305. Outboard edge 321 of the shifting assembly 306 is outboard with respect to outboard edge 311 of the bearing support 305. In each case (drive assemblies 400 and 500), it can still be said that the shifting assembly 306 substantially fits within the axial borders 310, 311 of the wheel bearing support 305.

Figure 6:
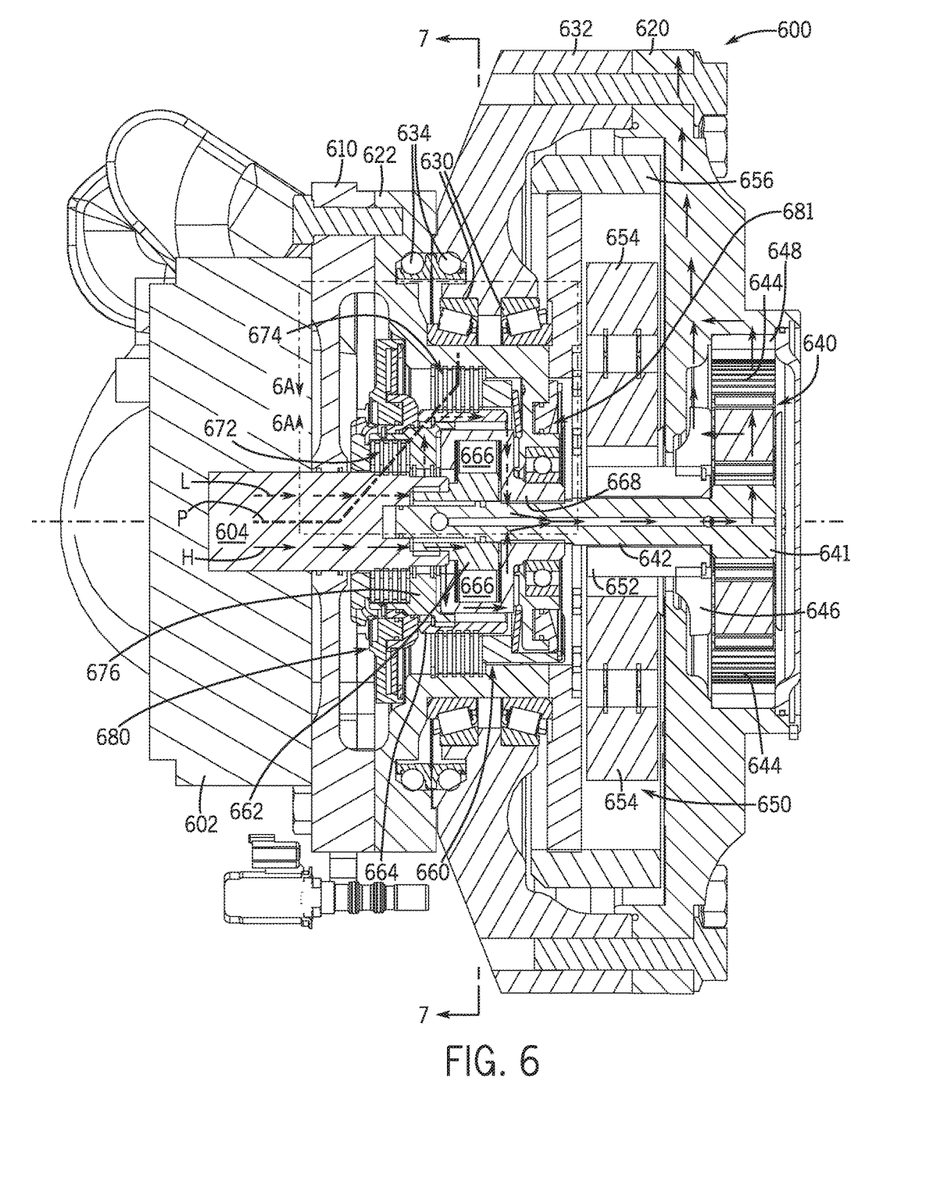
FIG. 6 is a side sectional view of the example drive assembly of FIG. 2.
Figure 7:
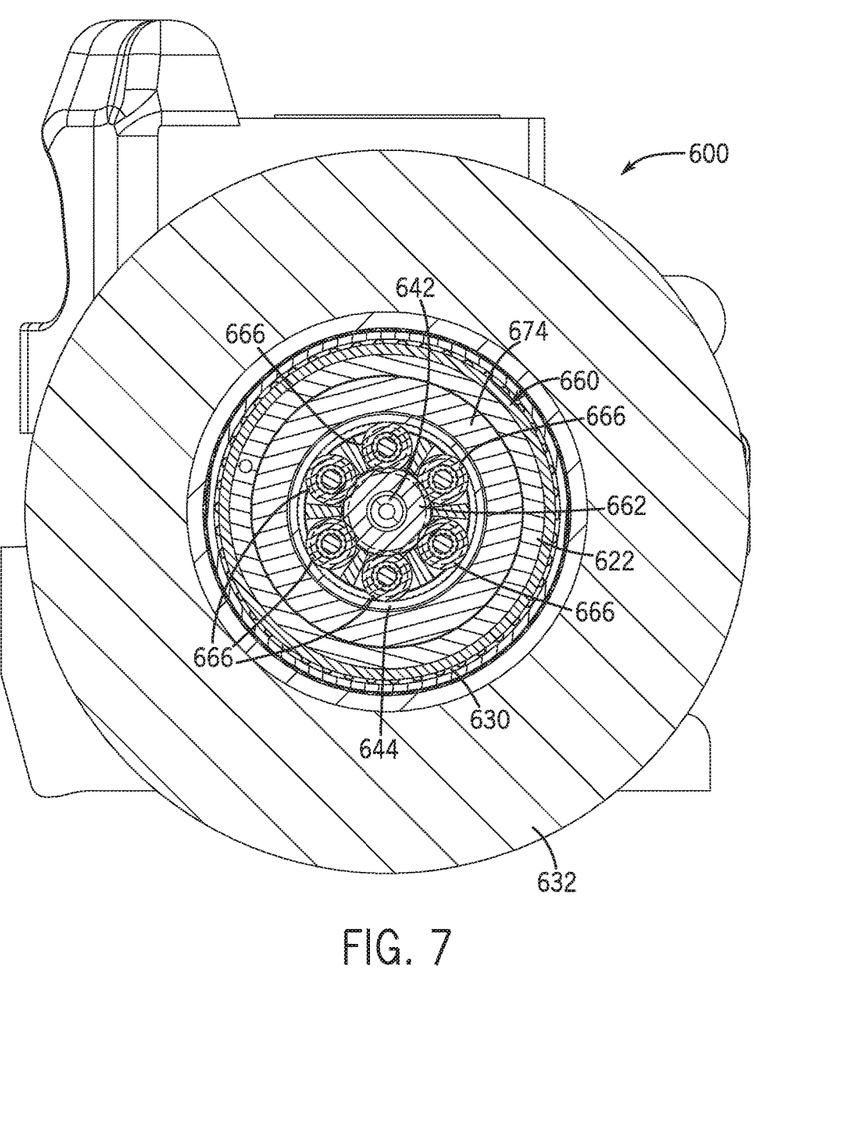
FIG. 7 is a front sectional view of an example shifting planetary set taken along plane 7-7 of FIG. 6.

FIG. 6 is a side sectional view of an example drive assembly 600 that may be used to implement the drive assembly 200 of FIG. 2, and FIG. 7 is a close-up section view of a portion of the drive assembly of FIG. 6. As a preliminary matter, it will be appreciated that various components (or assemblies) of the drive assembly 600 may generally exhibit radial symmetry, such that for these components the views depicted herein may represent a view of any number of diametric planes through the drive assembly 600. In FIG. 6, the inboard direction corresponds to leftward, and the outboard direction corresponds to rightward.

The drive assembly 600 includes a wheel mount 620 that rotates with respect to a mounting frame or drive housing 610. The drive housing 610 is configured to be securely mounted to the frame 22 of the motor grader 20, while the wheel mount 620 is configured to be securely mounted to one of the drive wheels 30 of the motor grader 20. The drive assembly 600 includes a bearing assembly 630 that includes two annular roller bearing assemblies, as shown. Inner diameters of the bearings 630 are mounted to (i.e., radially and axial supported by) a housing hub 622 that mounts (e.g., bolts) to the drive housing 610. The outer diameter of the bearings 630 are mounted to a bearing support 632 that connects to (e.g., bolts), and forms part of, the wheel mount 620. Face seals 634 may be mounted in annular grooves formed in the opposing faces of the housing hub 622 and the bearing support 632 to retain fluids (e.g., hydraulic fluid, lubricant, coolant and the like) and block external debris and contaminants. A drive motor 602 (e.g., an electric motor) mounts to the inboard (left in FIG. 6) axial end of the drive housing 610.

The drive assembly 600 includes three planetary gear sets, including reduction planetary sets 640, 650 and a shifting planetary set 660. The drive assembly 600, and specifically the range shifting assembly thereof, includes two clutch components (or "clutch packs") 672, 674 that are communicatively coupled to the shifting planetary set 660. Briefly, when the clutch pack 672 is engaged (or energized), the drive assembly 600 operates in a low speed mode L. When clutch pack 674 is engaged, the drive assembly 600 operates in a high speed mode H. The drive assembly 600 operates in a neutral mode N when neither clutch pack 672, 674 is engaged and in a park mode P when both clutch packs 672, 674 are engaged. The modes of operation are described further below.

More specifically now, with reference to FIGS. 6 and 7, the drive assembly 600 includes an input shaft 604 driven by the drive motor 602 to which is splined either the set of friction disks or separator disks of the clutch pack 672. The other set of separator disks or friction disks is splined to a clutch hub 676 at the inner diameter of a recessed pocket 678. Engagement and disengagement of the clutch pack 672 are performed by an actuator assembly 680, which includes an annular piston plate 682, an annular piston chamber plate 684 and a spring 686. In this embodiment, the components of the actuator assembly 680 are located radially outward of the clutch pack 672 so as to further optimize the axial compactness of the drive assembly 600. Similar axial space-saving may be achieved by alternate arrangements in which the actuator assembly 680 was at a radially inward location with respect to the clutch pack 672. In operation, the actuator assembly 680 is configured so that the spring 686 applies a force acting (rightward in FIG. 6) on the piston plate 682 such that a central portion 688 of which is capable of bringing the interleaved friction and separator disks into close frictional contact so as to engage the clutch pack 672 and cause the clutch hub 676 to rotate with the input shaft 604. Introducing hydraulic fluid pressure between an annular piston 690 of the piston plate 682 and a piston chamber 692 of the piston chamber plate 684 applies a force acting (leftward in FIG. 6) on the piston plate 682 sufficient to overcome the spring force and sufficiently separate the friction and separator disks to disengage the clutch pack 672 and disconnect the clutch hub 676 from the input shaft 604. In this example, the piston chamber plate 684 is mounted (e.g., by snap rings or splines) to the clutch hub 676 and axially stationary, however, other configurations are envisioned. Moreover, the spring 686 in this embodiment is a Belleville-type spring that fits within an annular groove 695 of the piston plate 682 and is captured axially between an annular lip 694 of the clutch hub 676 and a snap ring 696 mounted to the piston plate 682.

As shown and described, the actuator assembly 680 provides spring-applied, hydraulically-released action for the clutch pack 672 and facilitates the axial compactness of the drive assembly 600. The relatively large diameter spring and annular piston arrangement are positioned in a radially different location (e.g., radially outward of) the clutch pack 672. Moreover, the use of the large spring 686 provides for greater axial force to be applied to the clutch pack 672 over a shorter axial distance, which improves the energization and life of the clutch pack 672, and thereby the drive assembly 600.

The shifting planetary set 660 receives rotational input from the input shaft 604 from one of two power paths, namely via a splined interface of the input shaft 604 and a sun gear 662 and via a toothed interface of the clutch hub 676 and a ring gear 664. The sun gear 662 receives rotational input from the input shaft 604 continuously (except when the input shaft 604 is held stationary (e.g., via motor control logic)). The ring gear 664 receives rotational input only when the clutch pack 672 is engaged, and the ring gear 664 rotates only when the clutch pack 674 is disengaged. The shifting planetary set 660 includes a plurality of planet gears 666 (e.g., six in the example embodiment, although only two are shown in FIG. 6) that are supported on pinion shafts (shown in FIG. 7) of a carrier 668, which rotates on a bearing 670. The carrier 668 is splined to a second stage sun shaft 642. Thus, in this example embodiment, the shifting planetary set 660 is a sun-in, carrier-out single planetary set. The shifting planetary set 660 (and the clutch pack 674) fit axially within the axial borders of the bearing support 632, as shown, as well as radially within the inner diameter of the bearing support 632. The simple, single planetary configuration aids in the axially compactness of the drive assembly 600. Yet, the shifting planetary set 660 provides gear ratios for two output speeds and neutral as well as facilitates a park brake feature depending on the state of the two clutch packs 672, 674.

Figure 6A:
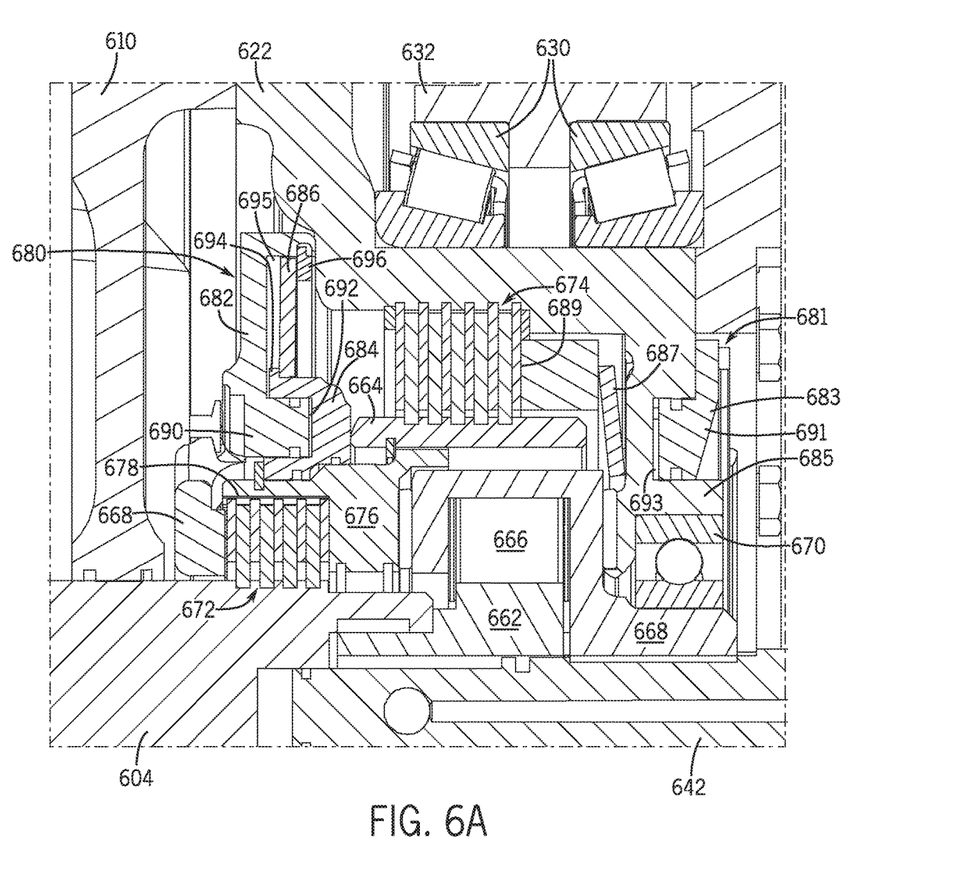
FIG. 6A is a close-up section view of area 6A-6A of the drive assembly of FIG. 6.

The clutch pack 674 is located radially between the housing hub 622 and the ring gear 664 of the shifting planetary set 660, with either the set of friction disks or separator disks being splined to the inner or outer diameter of the respective components. The clutch pack 674 is, at least in part, located within axial borders of the shifting planetary set 660 such that, at least in part, the clutch pack 674 is in radial alignment with the planet gears 666, as shown in FIG. 6A. Engagement and disengagement of the clutch pack 674 are performed by another actuator assembly 681 that is mounted to the housing hub 622, an end of which forms a piston chamber plate 685 that cooperates with an annular piston plate 683 and a spring 687. In this embodiment, the components of the actuator assembly 681 are located axially adjacent to the clutch pack 674, and, at least in part, radially outward and within the axial borders of the shifting planetary set 660 so as to further optimize the axial compactness of the drive assembly 600. In operation, the actuator assembly 681 is configured so that the spring 687 applies a force acting (leftward in FIG. 6) on the piston plate 683 such that an outer peripheral face 689 of which is capable of bringing the interleaved friction and separator disks into close frictional contact so as to engage the clutch pack 674 and cause the ring gear 664 to be fixed against rotation with the housing hub 622. Introducing hydraulic fluid pressure between an annular piston 691 of the piston plate 683 and a piston chamber 693 of the piston chamber plate 685 applies a force acting (to the right in FIG. 6) on the piston plate 683 sufficient to overcome the spring force and sufficiently separate the friction and separator disks to disengage the clutch pack 674 to disconnect the ring gear 664 from the housing hub 622 and allow it to be rotated. In this example, the spring 687 is a Belleville-type spring that fits within a recess in the housing hub 622 and is captured axially between the housing hub 622 and the piston plate 683.

Having described the example shifting assembly and the shifting planetary set 660 in detail, the modes of the drive assembly 600 will now be described with continued reference to FIGS. 6, 6A and 7. The power flow path for the low speed mode L is shown generally by dashed arrows L. As mentioned, the low speed mode L of the drive assembly 600 is effected by the clutch pack 672 being engaged and the clutch pack 674 being disengaged. As the motor 602 rotates the input shaft 604 with the clutch pack 672 biased by the spring 686 into the engaged position (as shown in FIGS. 6 and 7), the clutch hub 676 rotates the ring gear 664, which is permitted by hydraulic pressure being applied to the actuator assembly 681 to disengage the clutch pack 674. In this state, the ring gear 664 and the sun gear 662 are rotating together (effectively "locked") such that the shifting planetary set 660 rotates as a unit at the speed of the input shaft 604. Power thus flows from the carrier 668 to the second stage sun shaft 642 to the other planetary sets, namely the reduction planetary sets 640 and 650 to rotate the wheel mount 620 and thereby drive the drive wheels 30, as described below.

The high speed mode H of the drive assembly 600 is effected by the clutch pack 672 being disengaged and the clutch pack 674 being engaged. Hydraulic pressure biases against the spring 686 to release the clutch pack 672 and thus disconnect the clutch hub 676, and the spring 687 closes the clutch pack 674 to lock the ring gear 664 to the housing hub 622. In this state, the input shaft 604 rotates only the sun gear 662, which drives the planet gears 666 to orbit within the fixed ring gear 664 and rotate the carrier 668 at a different speed than the input shaft 604 rotates. Again, power flows from the carrier 668 to the second stage sun shaft 642 to the reduction planetary sets 640 and 650. The power flow path for the high speed mode H is shown generally by solid arrows H.

Neutral mode N and park mode P of the drive assembly 600 are effected by the clutch packs 672, 674 being simultaneously disengaged and engaged, respectively. In neutral mode N, disengagement of the clutch packs 672, 674 causes the ring gear 664 to neither be locked nor driven to rotate, but rather to be freely rotatable. As a result, the shifting planetary set 660 does not turn the carrier 668, and thus does not output power to the second stage sun shaft 642. Rather, if the vehicle is moving, forces acting on the drive wheels 30 may tend to counter-rotate the reduction planetary sets 640 and 650, and thereby the second stage sun shaft 642, which in turn may counter-rotate the carrier 668 and the shifting planetary set 660. In order to prevent back-driving the motor 602, motor control logic maybe applied to hold the input shaft 604 stationary by issuing a zero speed motor command signal. In park mode P, with both clutch packs 672, 674 locked up, the input shaft 604 is held stationary by a fixed mechanical connection to the housing hub 622 via the clutch hub 676 and the ring gear 664. The drive assembly 600 is thus braked. The mechanical path for the park mode P is shown generally by dot-dashed line P.

The power flow from the shifting planetary set 660 to the drive wheels 30 is the same in the L and H modes and shown generally by the solid arrows O beginning at the second stage sun shaft 642. As shown, rotation of the shaft 642 turns an integrally mounted second stage sun gear 641, to engage three second stage planet gears 644 (two shown in FIG. 6) of the reduction planetary set 640. These planets 644 are mounted to pinion shafts (not shown) of a second stage carrier 646, which is also splined to a third stage sun gear 652 of the reduction planetary set 650. A second stage ring gear 648 is splined to a third stage carrier, which forms the wheel mount 620. Rotation of third stage sun gear 652 engages three third stage planet gears 654 (two shown in FIG. 6) that are mounted to pinion shafts (not shown) of the third stage carrier. A third stage ring gear 656 is fixed to the housing hub 622, which causes the third stage planet gears 654 to orbit, and thereby the third stage carrier to rotate. This configuration causes power to follow a split path, flowing both from the second stage ring gear 648 and the second stage carrier 646 to the third stage carrier, that is, in part the wheel mount 620, at the corresponding gear ratio. The wheel mount 620 mounts and drives the drive wheels 30.

Figure 8:
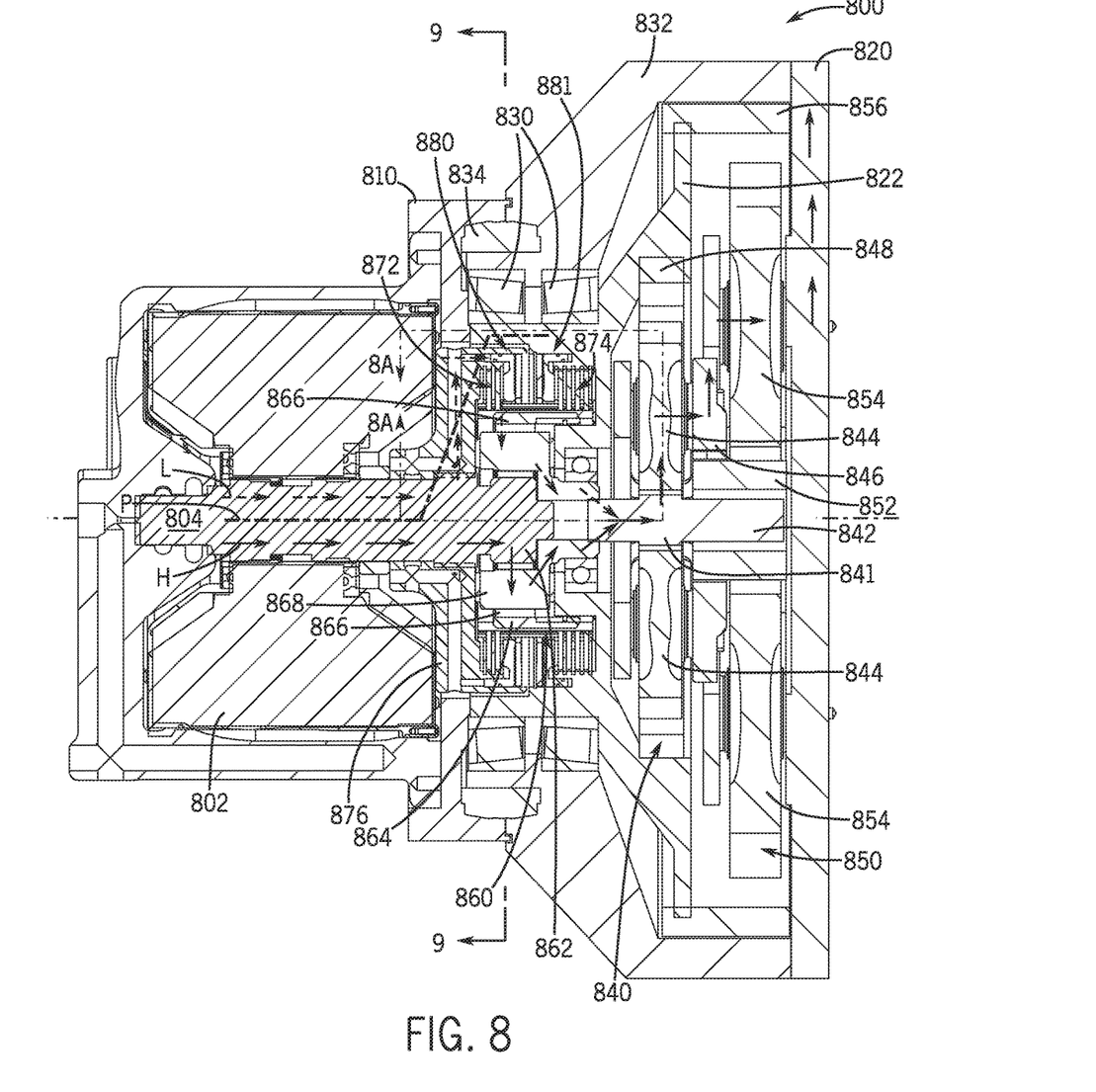
FIG. 8 is a sectional view of another example drive assembly.
Figure 9:
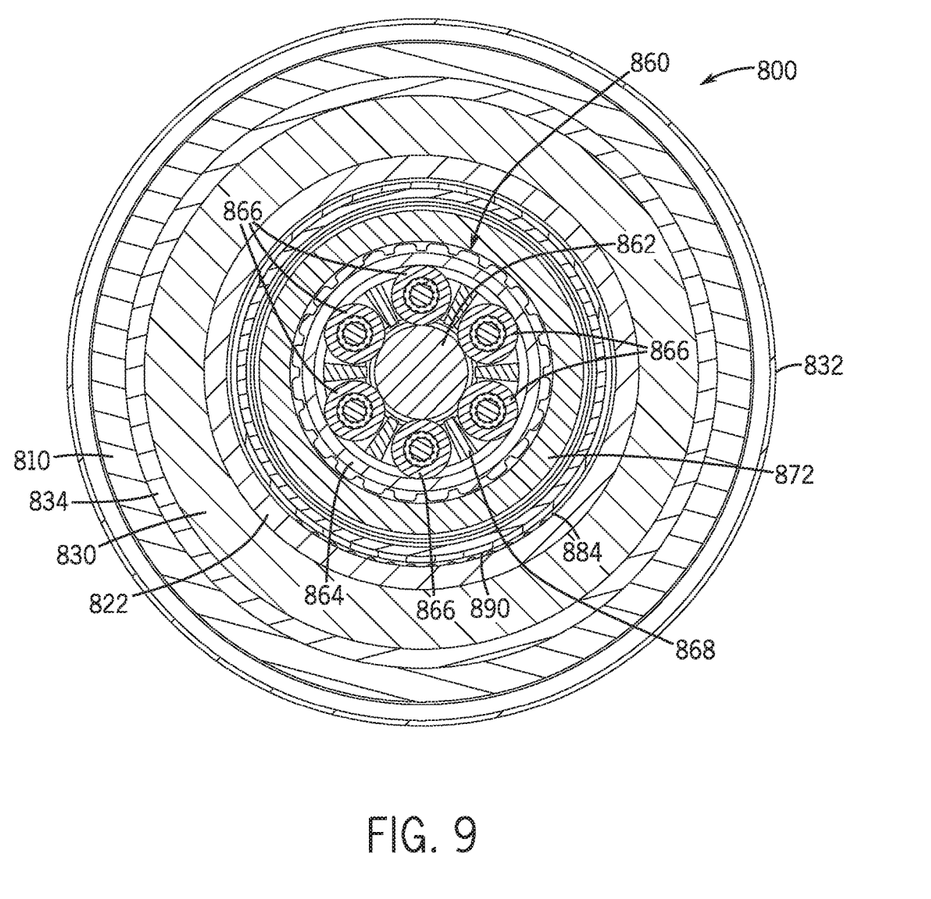
FIG. 9 is a front sectional view of another example shifting planetary set taken along plane 9-9 of FIG. 8.

A second example drive assembly 800 that may be used to implement the drive assembly 200 of FIG. 2 is shown in FIGS. 8 and 9. As with the example shown in FIG. 6, the various components and assemblies illustrated may generally exhibit radial symmetry, such that for these components the views depicted may represent a view of any number of diametric planes. The inboard direction corresponds to leftward, and the outboard direction corresponds to rightward in these figures.

The drive assembly 800 includes a wheel mount 820 that rotates with respect to a mounting frame or drive housing 810. The drive housing 810 is configured to be securely mounted to the frame 22 of the motor grader 20, while the wheel mount 820 is configured to be securely mounted to one of the drive wheels 30 of the motor grader 20. The drive assembly 800 includes a bearing assembly 830 that includes two annular roller bearing assemblies, as shown. Inner diameters of the bearings 830 are mounted to (i.e., radially and axial supported by) a housing hub 822 that mounts (e.g., bolts) to the drive housing 810. The outer diameter of the bearings 830 are mounted to a bearing support 832 that connects to (e.g., bolts), and forms part of, the wheel mount 820. A seal 834 (e.g., metal face seal) may be mounted in an annular groove formed in the bearing support 832 to retain fluids (e.g., hydraulic fluid, lubricant, coolant and the like) and block external debris and contaminants. A drive motor 802 (e.g., an electric motor) mounts to the inboard (left in FIG. 8) axial end of the drive housing 810.

The drive assembly 800 includes three planetary gear sets, including reduction planetary sets 840, 850 and shifting planetary set 860. The drive assembly 800, and specifically the range shifting assembly thereof, includes two clutch components (or "clutch packs") 872, 874 that are communicatively coupled to the shifting planetary set 860. Briefly, when the clutch pack 872 is engaged (or energized), the drive assembly 800 operates in a low speed mode L. When clutch pack 674 is engaged, the drive assembly 600 operates in a high speed mode H. The drive assembly 600 operates in a neutral mode N when neither clutch pack 672, 674 is engaged and in a park mode P when both clutch packs 672, 674 are engaged. The modes of operation are described further below.

Referring still to FIGS. 8 and 9, the drive assembly 800 includes an input shaft 804 driven by the drive motor 802 to which is splined a clutch hub 876. At the inner diameter of a recessed pocket 878 of the clutch hub 876 is splined a set of the friction disks or separator disks of the clutch pack 872. Engagement and disengagement of the clutch pack 872 are performed by an actuator assembly 880, which includes an annular piston plate 882, a piston chamber plate 884 formed by an end of the clutch hub 876, and a spring 886. In this embodiment, the components of the actuator assembly 880 are located in part radially outward of the clutch pack 872 and entirely radially outward of the shifting planetary set 860 so as to further optimize the axial compactness of the drive assembly 800. Similar axial space-saving may be achieved by alternate arrangements in which the actuator assembly 880 was at a radially inward location with respect to the clutch pack 872 or a ring gear of the shifting planetary set 860. In operation, the actuator assembly 880 is configured so that the spring 886 applies a force acting (leftward in FIG. 8) on the piston plate 882 such that a central portion 888 of which is capable of bringing the interleaved friction and separator disks into close frictional contact so as to engage the clutch pack 872 and cause the clutch hub 876 to rotate a ring gear 864 of the shifting planetary set 860 with the input shaft 804. Introducing hydraulic fluid pressure between an annular piston 890 of the piston plate 882 and the piston chamber 892 applies a force acting (to the right in FIG. 8) on the piston plate 882 sufficient to overcome the spring force and sufficiently separate the friction and separator disks to disengage the clutch pack 872 and disconnect the clutch hub 876 from the ring gear 864. In this example, the spring 886 is a Belleville-type spring that fits within the recessed pocket 878 of the clutch hub 876 adjacent to the piston plate 882 and is captured axially between an annular lip 894 of the piston plate 882 and a snap ring 896 mounted to the clutch hub 876.

The actuator assembly 880 provides spring-applied, hydraulically-released action for the clutch pack 872 and facilitates the axial compactness of the drive assembly 800. The relatively large diameter spring and annular piston arrangement are positioned in a radially different location (e.g., radially outward of) the shifting planetary set 860, and in part the clutch pack 872. Moreover, the use of the large spring 886 provides for greater axial force to be applied to the clutch pack 872 over a shorter axial distance, which improves the energization and life of the clutch pack 872, and thereby the drive assembly 800.

The shifting planetary set 860 receives rotational input from the input shaft 804 from one of two power paths, namely via an integral connection of the input shaft 804 with a sun gear 862 and via the clutched interface of the clutch hub 876 and the ring gear 864. The sun gear 862 receives rotational input from the input shaft 604 continuously (except when the input shaft 804 is held stationary (e.g., via motor control logic)). The ring gear 864 receives rotational input only when the clutch pack 872 is engaged, and the ring gear 864 rotates only when the clutch pack 874 is disengaged. The shifting planetary set 860 includes a plurality of planet gears 866 (e.g., six in the example embodiment, although only two are shown in FIG. 8) that are supported on pinion shafts (shown in FIG. 9) of a carrier 868, which rotates on bearing 870. The carrier 868 is splined to a second stage sun shaft 842. Thus, in this example embodiment, the shifting planetary set 860 is a sun-in, carrier-out single planetary set. The shifting planetary set 860 (and the clutch packs 872, 874) fit axially within the axial borders of the bearing support 832, as shown, as well as radially within the inner diameter of the bearing support 832. The simple, single planetary configuration aids in the axially compactness of the drive assembly 800. Yet, the shifting planetary set 860 provides gear ratios for two output speeds and neutral as well as facilitates a park brake feature depending on the state of the two clutch packs 872, 874.

The clutch pack 874 is located radially between the housing hub 822 and the ring gear 864 of the shifting planetary set 860, with either the set of friction disks or separator disks being splined to the inner or outer diameter of the respective components. The clutch pack 874 is, at least in part, located within axial borders of the shifting planetary set 860 such that, at least in part, the clutch pack 874 is in radial alignment with the planet gears 866. This is also true for clutch pack 872, such that, in the example embodiment shown in FIG. 8A, both clutch packs 872 and 874 are located within the axial borders of the planetary set 860. Engagement and disengagement of the clutch pack 874 are performed by another actuator assembly 881 that is mounted to the housing hub 822, an end of which forms a piston chamber plate 885 that cooperates with an annular piston plate 883 and a spring 887. In this embodiment, the components of the actuator assembly 881 are located in axial and radial locations with respect to the shifting planetary set 860 and clutch pack 674 similar to actuator assembly 880, that is, entirely radially outward and within the axial borders of the shifting planetary set 860 and partially radially outward of the clutch pack 874 so as to further optimize the axial compactness of the drive assembly 800. In the example embodiment shown in FIG. 8A, both actuator assemblies 880 and 881 are located within the axial borders of the planetary set 860. In operation, the actuator assembly 881 is configured so that the spring 887 applies a force acting (rightward in FIG. 8) on the piston plate 883 such that such that a central portion 889 of which capable of bringing the interleaved friction and separator disks into close frictional contact so as to engage the clutch pack 874 and cause the ring gear 864 to be fixed against rotation with the housing hub 822. Introducing hydraulic fluid pressure between an annular piston 891 of the piston plate 883 and a piston chamber 893 of the piston chamber plate 885 applies a force acting (leftward in FIG. 8) on the piston plate 883 sufficient to overcome the spring force and sufficiently separate the friction and separator disks to disengage the clutch pack 874 to disconnect the ring gear 864 from the housing hub 822 and allow it to be rotated. In this example, the spring 887 is a Belleville-type spring that fits within the housing hub 822 adjacent to the piston plate 883 and is captured axially between an annular lip 895 of the piston plate 883 and a snap ring 897 mounted to the housing hub 822.

Figure 8A:
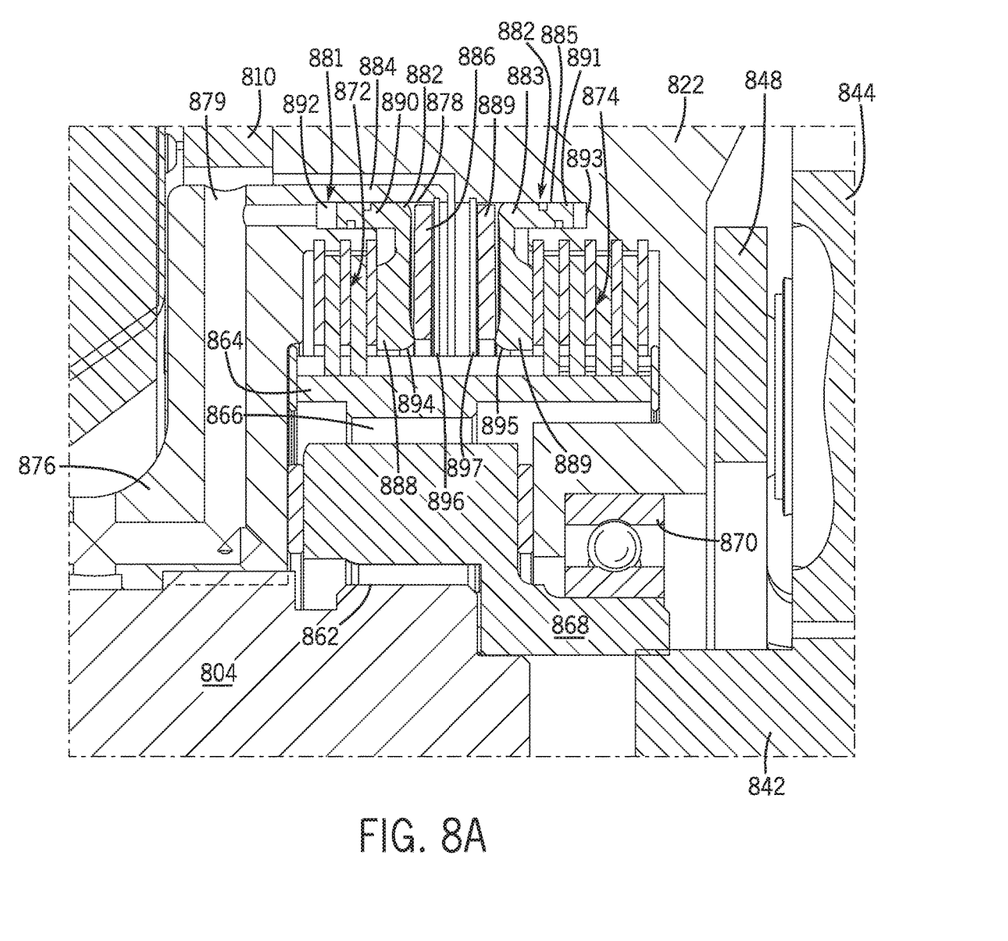
FIG. 8A is a close-up section view of area 8-8A of the drive assembly of FIG. 8.

Having described the example shifting assembly and the shifting planetary set 860 in detail, the modes of the drive assembly 800 will now be described with continued reference to FIGS. 8, 8A and 9. The power flow path for the low speed mode L is shown generally by dashed arrows L. As mentioned, the low speed mode L of the drive assembly 800 is effected by the clutch pack 872 being engaged and the clutch pack 874 being disengaged. As the motor 802 rotates the input shaft 804 with the clutch pack 872 biased by the spring 886 into the engaged position (as shown in FIGS. 8 and 9), the clutch hub 876 rotates the ring gear 864, which is permitted by hydraulic pressure being applied to the actuator assembly 881 to disengage the clutch pack 874. In this state, the ring gear 864 and the sun gear 862 are rotating together (effectively "locked") such that the shifting planetary set 860 rotates as a unit at the speed of the input shaft 804. Power thus flows from the carrier 868 to the second stage sun shaft 842 to the other planetary sets, namely the reduction planetary sets 840 and 850 to rotate the wheel mount 820 and thereby drive the drive wheels 30, as described below.

The high speed mode H of the drive assembly 800 is effected by the clutch pack 872 being disengaged and the clutch pack 874 being engaged. Hydraulic pressure via internal passages 879 in the clutch hub 876 biases against the spring 886 to release the clutch pack 872 and thus disconnect the clutch hub 876 from the ring gear 864, and the spring 887 closes the clutch pack 874 to lock the ring gear 864 to the housing hub 822. In this state, the input shaft 804 rotates only the sun gear 862, which drives the planet gears 866 to orbit within the fixed ring gear 864 and rotate the carrier 868 at a different speed than the input shaft 804 rotates. Power flows from the carrier 868 to the second stage sun shaft 842 to the reduction planetary sets 840 and 650. The power flow path for the high speed mode H is shown generally by the solid arrows H.

Neutral mode N and park mode P of the drive assembly 800 are effected by the clutch packs 872, 874 being simultaneously disengaged and engaged, respectively. In neutral mode N, disengagement of the clutch packs 872, 874 causes the ring gear 864 to neither be locked nor driven to rotate, but rather to be freely rotatable. As a result, the shifting planetary set 860 does not turn the carrier 868, and thus does not output power to the second stage sun shaft 842. Rather, if the vehicle is moving, forces acting on the drive wheels 30 may tend to counter-rotate the reduction planetary sets 840 and 850, and thereby the second stage sun shaft 842, which in turn may counter-rotate the carrier 868 and the shifting planetary set 860. In order to prevent back-driving the motor 802, motor control logic maybe applied to hold the input shaft 804 stationary by issuing a zero speed motor command signal. In park mode P, with both clutch packs 872, 874 locked up, the input shaft 804 is held stationary by a fixed mechanical connection to the housing hub 822 via the clutch hub 876 and the ring gear 864, which brakes the drive assembly 800. The mechanical path for the park mode P is shown generally by the dot-dash line P.

The power flow from the shifting planetary set 860 to the drive wheels 30 is the same in the L and H modes and shown generally by solid arrows O beginning at the second stage sun shaft 842. As shown, rotation of the shaft 842 turns an integrally mounted second stage sun gear 841, to engage three second stage planet gears 844 (two shown in FIG. 8) of the reduction planetary set 840. These planets 844 are mounted to pinion shafts (not shown) of a second stage carrier 846, which is also splined to a third stage sun gear 852 of the reduction planetary set 850. A second stage ring gear 848 is fixed (splined or otherwise mounted) to the housing hub 822 so that rotation of the second stage sun gear 841 will cause the second stage planet gears 844 orbit within the second stage ring gear 848 to rotate the second stage carrier 846, and thereby the third stage sun gear 852. Rotation of third stage sun gear 852 engages three third stage planet gears 854 (two shown in FIG. 8) that are mounted to pinion shafts (not shown) of a third stage carrier, which in part forms the wheel mount 820. A third stage ring gear 856 is fixed to the housing hub 822, which causes the third stage planet gears 854 to orbit, and thereby the third stage carrier to rotate. This configuration causes power to flow from the second stage sun gear 841 through the second stage carrier 846 to the third stage sun gear 852 and on through the third stage carrier or wheel mount 820, at the corresponding gear ratio. The wheel mount 820 mounts and drives the drive wheels 30.

The above describes example embodiments of a compact drive assembly that may provide deep gear reduction ratios and high torque. As non-limiting examples, the above-described constructions are suitable to provide a drive assembly with gear reduction ratios of about 100-150 and output torque of about 20,000-25,000 Nm. This functionality can be achieved in an assembly having a small form-factor, such as in which the wheel mount dimension is about 500-600 mm (e.g., 535 mm) in diameter and about 300-400 mm (e.g., 370 mm) in the axial dimension.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various implementations other than those explicitly described are within the scope of the claims.

What is claimed is:

1. A drive assembly receiving rotational power from an input shaft rotatable about a rotation axis, the drive assembly comprising:
    a drive housing;
    a wheel mount having a wheel bearing support mounted to the drive housing and configured to rotate about the rotation axis on a wheel bearing assembly;
    a planetary set having planet gears and being coupled between the input shaft and the wheel mount to selectably cause rotation of the wheel mount;
    a clutch arrangement coupled to the planetary set, the clutch arrangement being, at least in part, located within axial borders of the planetary set; and
    an actuator arrangement configured to control the clutch arrangement to operate the planetary set so that the drive assembly effects a first rotational speed of the wheel mount, a second rotational speed of the wheel mount and a brake of the wheel mount, the actuator arrangement being, at least in part, located within axial borders of the planetary set;
    wherein the planetary set, the clutch arrangement and the actuator arrangement, at least in part, fit within axial borders of the wheel bearing support and within an inner radial dimension of the wheel bearing support.

2. The drive assembly of claim 1, wherein the clutch arrangement includes a first clutch component and a second clutch component.

3. The drive assembly of claim 2, wherein both of the first and second clutch components are located within the axial borders of the planetary set.

4. The drive assembly of claim 2, wherein engagement of the first clutch component corresponds to the first rotational speed of the wheel mount, and engagement of the second clutch component corresponds to the second rotational speed of the wheel mount that is greater than the first rotational speed.

5. The drive assembly of claim 4, wherein engagement of the first and second clutch components brakes the wheel mount.

6. The drive assembly of claim 4, wherein disengagement of the first and second clutch components effects free rotation of the wheel mount.

7. The drive assembly of claim 4, wherein engagement of the first clutch component couples the input shaft to a ring gear of the planetary set for co-rotation of the ring gear with the input shaft; and
    wherein engagement of the second clutch component couples the ring gear of the planetary set to the drive housing to fix the ring gear against rotation.

8. The drive assembly of claim 7, further including a clutch hub mechanically interfaced with the ring gear to effect rotation of the ring gear with the input shaft when the first clutch component is engaged.

9. The drive assembly of claim 8, wherein the first clutch component is in part splined to the input shaft and in part splined to the clutch hub; and
    wherein the clutch hub includes a toothed periphery that engages a toothed inner diameter of the ring gear of the planetary set.

10. The drive assembly of claim 8, wherein the actuator arrangement includes a spring and a hydraulic piston for engaging and disengaging the first clutch component.

11. The drive assembly of claim 10, wherein the spring and hydraulic piston of the actuator arrangement are arranged radially outward of the first clutch component within axial borders for the first clutch component.

12. The drive assembly of claim 10, wherein the actuator arrangement includes a second spring and a second hydraulic piston for engaging and disengaging the second clutch component.

13. The drive assembly of claim 12, wherein the springs bias the associated hydraulic pistons to engage the associated first and second clutch component and hydraulic pressure biases the hydraulic pistons to counter and overcome the associated spring to disengage the associated first and second clutch component.

14. The drive assembly of claim 12, wherein the springs are Belleville springs.

15. The drive assembly of claim 2, wherein the planetary set is a single planetary set that includes a single sun gear, a single ring gear and a single carrier for carrying the planet gears that rotatably mesh with the sun and ring gears;
   wherein the input shaft rotates at least one of the sun gear and the ring gear; and
   wherein the carrier mounts the wheel mount to provide rotational output to the wheel mount.

16. The drive assembly of claim 15, wherein the first rotational speed is effected by rotational input from the input shaft to the planetary set only through the sun gear; and
   wherein the second rotational speed is effected by rotational input from the input shaft to the planet set through the sun gear and the ring gear.

17. A drive assembly, comprising:
   a drive housing:
   a motor mounted to the drive housing rotating an input shaft about a rotation axis:
   a wheel mount having a wheel bearing support mounted to the drive housing and configured to rotate about the rotation axis on a wheel bearing assembly;
   a planetary set having planet gears and being coupled between the input shaft and the wheel mount to selectably cause rotation of the wheel mount at one of at least two different rotational speeds;
   a clutch arrangement coupled to the planetary set, the clutch arrangement being, at least in part, located within axial borders of the planetary set; and
   an actuator arrangement configured to control the clutch arrangement to operate the planetary set so that the drive assembly effects a first rotational speed of the wheel mount, a second rotational speed of the wheel mount and a brake of the wheel mount, the actuator arrangement being, at least in part, located within axial borders of the planetary set;
   wherein the planetary set, the clutch arrangement and the actuator arrangement, at least in part, fit within axial borders of the wheel bearing support and within an inner radial dimension of the wheel bearing support.

18. The drive assembly of claim 17, wherein the clutch arrangement includes a first clutch component and a second clutch component;
   wherein engagement of the first clutch component couples the input shaft to the ring gear of the planetary set for co-rotation of a ring gear with the input shaft; and
   wherein engagement of the second clutch component couples the ring gear of the planetary set to the drive housing to fix the ring gear against rotation.

19. The drive assembly of claim 17, wherein the planetary set is a single planetary set that includes a single sun gear, a single ring gear and a single carrier for carrying the planet gears that rotatably mesh with the sun and ring gears; and
   wherein the input shaft rotates at least one of the sun gear and the ring gear; and
   wherein the carrier mounts the wheel mount to provide rotational output to the wheel mount.

20. The drive assembly of claim 19, wherein the first rotational speed is effected by rotational input from the input shaft to the planetary set only through the sun gear; and
   wherein the second rotational speed is effected by rotational input from the input shaft to the planet set through the sun gear and the ring gear.

\* \* \* \* \*